US012789925B2

(12) United States Patent
Ronan et al.

(10) Patent No.: US 12,789,925 B2
(45) Date of Patent: Nov. 10, 2026

(54) MOTOR STALL AND TRAILER LIFT

(71) Applicant: Outrider Technologies, Inc., Henderson, CO (US)

(72) Inventors: Tessa Ronan, Denver, CO (US); Vittorio Ziparo, Golden, CO (US); Lawrence Klein, Bend, OR (US); Ky Woodard, Denver, CO (US)

(73) Assignee: Outrider Technologies, Inc., Henderson, CO (US)

( * ) Notice: Subject to any disclaimer, the term of this patent is extended or adjusted under 35 U.S.C. 154(b) by 276 days.

(21) Appl. No.: 18/380,473

(22) Filed: Oct. 16, 2023

(65) Prior Publication Data

US 2024/0116583 A1 Apr. 11, 2024

Related U.S. Application Data

(63) Continuation of application No. 17/848,152, filed on Jun. 23, 2022, now Pat. No. 11,787,486.

(60) Provisional application No. 63/214,225, filed on Jun. 23, 2021.

(51) Int. Cl.
*B62D 49/00* (2006.01)
*B62D 53/08* (2006.01)
*B62D 53/12* (2006.01)

(52) U.S. Cl.
CPC ....... *B62D 49/007* (2013.01); *B62D 53/0821* (2013.01); *B62D 53/12* (2013.01)

(58) Field of Classification Search
CPC .............. B62D 49/007; B62D 49/0821; B62D 53/0821; B62D 53/12; B62D 53/08
See application file for complete search history.

(56) References Cited

U.S. PATENT DOCUMENTS

| | | | |
|---|---|---|---|
| 4,423,362 | A | 12/1983 | Konrad et al. |
| 5,617,490 | A | 4/1997 | Kume et al. |
| 9,862,242 | B2 | 1/2018 | Lurie |
| 10,861,189 | B2 | 12/2020 | Potnis |
| 11,014,416 | B2 | 5/2021 | Dodd et al. |
| 11,198,340 | B2 | 12/2021 | Ramirez Llanos et al. |
| 11,390,254 | B2 | 7/2022 | Pursifull |
| 11,787,486 | B2 | 10/2023 | Ronan et al. |

(Continued)

FOREIGN PATENT DOCUMENTS

| | | | | |
|---|---|---|---|---|
| CN | 111293934 | A | 6/2020 | |
| CN | 111698958 | A | 9/2020 | |
| EP | 1150019 | A1 * | 10/2001 | ............. B66C 13/16 |

OTHER PUBLICATIONS

First Office Action issued in Chinese Patent Application No. 202280057229.1 dated Jan. 8, 2025, 10 pages.

(Continued)

*Primary Examiner* — Mohammad Ali
*Assistant Examiner* — Vincent W Chang
(74) *Attorney, Agent, or Firm* — Cozen O'Connor

(57) ABSTRACT

A device and method operated thereby may control a hydraulic pump to pump a hydraulic fluid into a chamber of a piston coupled to a fifth wheel of the tractor to raise the fifth wheel. The device, and method operated thereby, may sense, at intervals as the fifth wheel rises, a pressure value of the hydraulic fluid in the chamber. The device, and method operated thereby, may process the pressure values to determine when the landing gear is lifted off the ground.

5 Claims, 13 Drawing Sheets

(56) References Cited

U.S. PATENT DOCUMENTS

| | | | | |
|---|---|---|---|---|
| 12,260,562 | B2 | 3/2025 | Ma et al. | |
| 2005/0057090 | A1 | 3/2005 | Kinser et al. | |
| 2006/0070774 | A1* | 4/2006 | Hammonds | B60D 1/36 180/6.2 |
| 2009/0132116 | A1 | 5/2009 | Tanaka et al. | |
| 2009/0164079 | A1 | 6/2009 | Stabrey | |
| 2009/0251090 | A1 | 10/2009 | Tanaka et al. | |
| 2010/0096203 | A1 | 4/2010 | Freese V et al. | |
| 2014/0015223 | A1* | 1/2014 | Banwart | B62D 53/0821 280/476.1 |
| 2014/0195124 | A1 | 7/2014 | Wellhoefer et al. | |
| 2014/0200759 | A1 | 7/2014 | Lu et al. | |
| 2015/0369317 | A1 | 12/2015 | Choe et al. | |
| 2016/0288601 | A1 | 10/2016 | Gehrke et al. | |
| 2016/0318601 | A1* | 11/2016 | Arnold | B64C 13/0421 |
| 2016/0361959 | A1 | 12/2016 | Keatley et al. | |
| 2017/0015163 | A1 | 1/2017 | Sielhorst | |
| 2017/0232969 | A1 | 8/2017 | Hunt et al. | |
| 2017/0241097 | A1* | 8/2017 | Sharp | E01C 19/34 |
| 2018/0202822 | A1 | 7/2018 | Delizio | |
| 2019/0016264 | A1 | 1/2019 | Potnis et al. | |
| 2019/0039425 | A1 | 2/2019 | Dodd et al. | |
| 2019/0064835 | A1 | 2/2019 | Hoofard et al. | |
| 2019/0258874 | A1 | 8/2019 | Zhang et al. | |
| 2019/0302764 | A1 | 10/2019 | Smith et al. | |
| 2019/0337342 | A1 | 11/2019 | Genheimer et al. | |
| 2019/0340787 | A1 | 11/2019 | Ramirez Llanos | |
| 2019/0347498 | A1 | 11/2019 | Herman et al. | |
| 2019/0367107 | A1* | 12/2019 | Grossman | B62D 53/125 |
| 2020/0014888 | A1 | 1/2020 | Magal | |
| 2020/0130582 | A1 | 4/2020 | Wong et al. | |
| 2020/0285913 | A1 | 9/2020 | Gavrilovic et al. | |
| 2020/0298643 | A1 | 9/2020 | Pursifull | |
| 2021/0053407 | A1* | 2/2021 | Smith | B25J 19/021 |
| 2021/0170820 | A1 | 6/2021 | Zhang | |
| 2022/0001897 | A1 | 1/2022 | Vasoya et al. | |
| 2022/0067963 | A1 | 3/2022 | Fendt | |
| 2022/0092356 | A1 | 3/2022 | Nagasamy et al. | |
| 2022/0170311 | A1 | 6/2022 | Mcneill et al. | |
| 2022/0212732 | A1* | 7/2022 | Peters | B60D 1/62 |
| 2022/0410990 | A1 | 12/2022 | Rust | |
| 2023/0123587 | A1* | 4/2023 | Jatt | B60W 30/06 701/23 |
| 2023/0194290 | A1 | 6/2023 | Yan | |
| 2023/0313503 | A1* | 10/2023 | Hayakawa | E02F 9/261 701/31.4 |
| 2024/0068894 | A1 | 2/2024 | Javidan et al. | |

OTHER PUBLICATIONS

Notice of Allowance for U.S. Appl. No. 17/848,152, mailed Jun. 1, 2023, 8 pages.

Extended European Search Report for European Application No. 22829322.1 mailed on Jun. 16, 2025, 11 pages.

International Patent Application No. PCT/US22/34766 International Search Report and Written Opinion dated Nov. 22, 2022, 11 pages.

Notice of Allowance for U.S. Appl. No. 18/400,956, mailed Apr. 16, 2026, 16 pages.

Non Final Office Action for U.S. Appl. No. 18/401,061, mailed May 4, 2026, 17 pages.

Final Office Action for U.S. Appl. No. 18/401,061, mailed Sep. 1, 2026, 26 pages.

* cited by examiner

MOTOR STALL AND TRAILER LIFT

RELATED APPLICATION

This application is a continuation of U.S. patent application Ser. No. 17/848,152 filed Jun. 23, 2022, which claims priority to U.S. Patent Application No. 63/214,225, titled "Motor Stall and Trailer Lift," filed Jun. 23, 2021, each of which is incorporated herein by reference in its entirety.

BACKGROUND

Trucks are an essential part of modern commerce. These trucks transport materials and finished goods across the continent within their large interior spaces. Such goods are loaded and unloaded at various facilities that can include manufacturers, ports, distributors, retailers, and end users. The start and end locations are referred to as "yards" and include areas that trailers are parked (and/or staged) and moved to and from for access by tractors (trucks) for loading to a dock door for loading/unloading cargo into the associated facility, leaving the yard for travel to its destination, or entering the yard from its destination. Autonomous yard vehicles technology includes tractors (trucks) that are capable of automatically (without human intervention, or with human intervention via teleoperation) coupling, decoupling, and maneuvering trailers that are within the yard.

Safety is of upmost importance in such automated yards. The automatic maneuvering of said trailers results in situations where, if a person or other obstacle is in the intended path of the trailer or tractor, because there is no human operating the tractor, there are situations where the tractor may not know of a human or obstacle. Thus, additional sensors are desired so that the controller of the automated tractor can maneuver the trailers safely.

Additional difficulties arise because various manufactures and freight companies have their own trailers. Thus, while an automated yard vehicle may have associated sensors, it is difficult to utilize sensors on the trailers themselves because it requires human (or machine) intervention on the trailer prior to maneuvering the trailer. This additional intervention step is timely and creates an additional location for safety concern.

SUMMARY

Trucks are an essential part of modern commerce. These trucks transport materials and finished goods across the continent within their large interior spaces. Such goods are loaded and unloaded at various facilities that can include manufacturers, ports, distributors, retailers, and end users. Large over-the road (OTR) trucks typically consist of a tractor or cab unit and a separate detachable trailer that is interconnected removably to the cab via a hitching system that consists of a so-called fifth wheel and a kingpin.

Further challenges in trucking relate to docking, loading and unloading of goods to and from trailers. Warehouses and good distribution facilities have yards with multiple loading docks, and the trailer is positioned at one of the loading docks for loading and unloading. In an automated yard, the OTR truck stops at a designated location in staging area of the yard, and the OTR tractor detaches, leaving the trailer at the designated location. An autonomous tractor moves the trailer to a first one of the loading docks for unloading and/or loading. Another, or the same, autonomous tractor moves the trailer away from the loading dock when loading and/or unloading is complete, and parked in a designated location of the staging area. The trailer may also be moved between loading docks if needed by another, or the same, autonomous tractor. Another, or the same, OTR tractor couples with the trailer and the OTR truck departs the yard for another destination.

When movement of an autonomous electric tractor is impeded, a drive motor of the autonomous electric tractor stalls. A safety feature deactivates the autonomous electric tractor when the drive motor stall is detected for more than a preset period, such as five seconds, requiring that the autonomous electric tractor is manually reactivated. One aspect of the present embodiments includes the realization that not all drive motor stalls indicate a safety problem, and that during autonomous operation of the autonomous electric tractor in the yard, a motor stall may occur during normal operation of the autonomous electric tractor, and that deactivation of the autonomous electric tractor is undesirable. The present embodiments solve this problem by detecting when the drive motor stalls and commanding zero throttle to prevent the safety feature from deactivating the autonomous electric tractor. Advantageously, the autonomous electric tractor is not deactivated and does not require manual reactivation. Further, based upon an activity of the autonomous electric tractor when the stall is detected, the activity may be retried and/or modified to prevent the drive motor from stalling. Although the examples used herein are for an autonomous electric tractor, similar detection and actions may be applied to autonomous tractors with combustions engines without departing from the scope hereof.

The autonomous tractor does not retract the landing gear of the trailer when maneuvering the trailer within the yard, but raises a fifth wheel of the autonomous tractor, when coupled with the trailer, to elevate the front end of the trailer and lift the landing gear off the ground. Another aspect of the present embodiments includes the realization that the landing gear of the trailer is not set to a standard height by a driver of the OTR truck when the trailer is deposited in the designated location of the staging area, and therefore the autonomous tractor does not know how high to lift the front end of the trailer to achieve a desired ground clearance for the landing gear. The present embodiments solve this problem by detecting a point when the landing gear leaves the ground as the autonomous tractor lifts the front end of the trailer and continues to raise the fifth wheel a distance beyond the detected point to achieve a desired height of the landing gear above ground level. Advantageously, the autonomous tractor lifts the front of the trailer such that the landing gear clears obstacles in the yard without raising the front of the trailer higher than needed.

In one embodiment, a method detects and prevents stall of a drive motor of an autonomous electric tractor. The method includes receiving, at intervals, a motor current value from a drive circuit of the autonomous electric tractor and determining when the motor current value reaches or exceeds a first current threshold. When the motor current value reaches or exceeds the first current threshold, the method applies brakes and inhibits a throttle controlling the drive motor.

In another embodiment, a method prevents stall of a motor of an autonomous vehicle. A motor current value is received at intervals from a drive circuit of the autonomous electric tractor. When the motor current value reaches or exceeds a first current threshold, brakes are applied and a throttle controlling the drive motor is inhibited for a predefined period from the determining the motor current value reached or exceeded the first current, and then the throttle is uninhibited.

In another embodiment, a method determines height above the ground of a landing gear of a trailer coupled with a tractor. A hydraulic pump is controlled to pump a hydraulic fluid into a chamber of a piston coupled to a fifth wheel of the tractor to raise the fifth wheel. As the fifth wheel rises, at intervals, a pressure value of the hydraulic fluid in the chamber is sensed. The pressure values are processed to determine when the landing gear is lifted off the ground.

DETAILED DESCRIPTION OF THE EMBODIMENTS

In an automated yard, an autonomous tractor moves trailers between staging areas and loading docks for unloading and/or loading. The autonomous tractor repeatedly couples (hitches) to a trailer, moves the trailer, and then decouples (unhitches) from the trailer.

Figure 1:
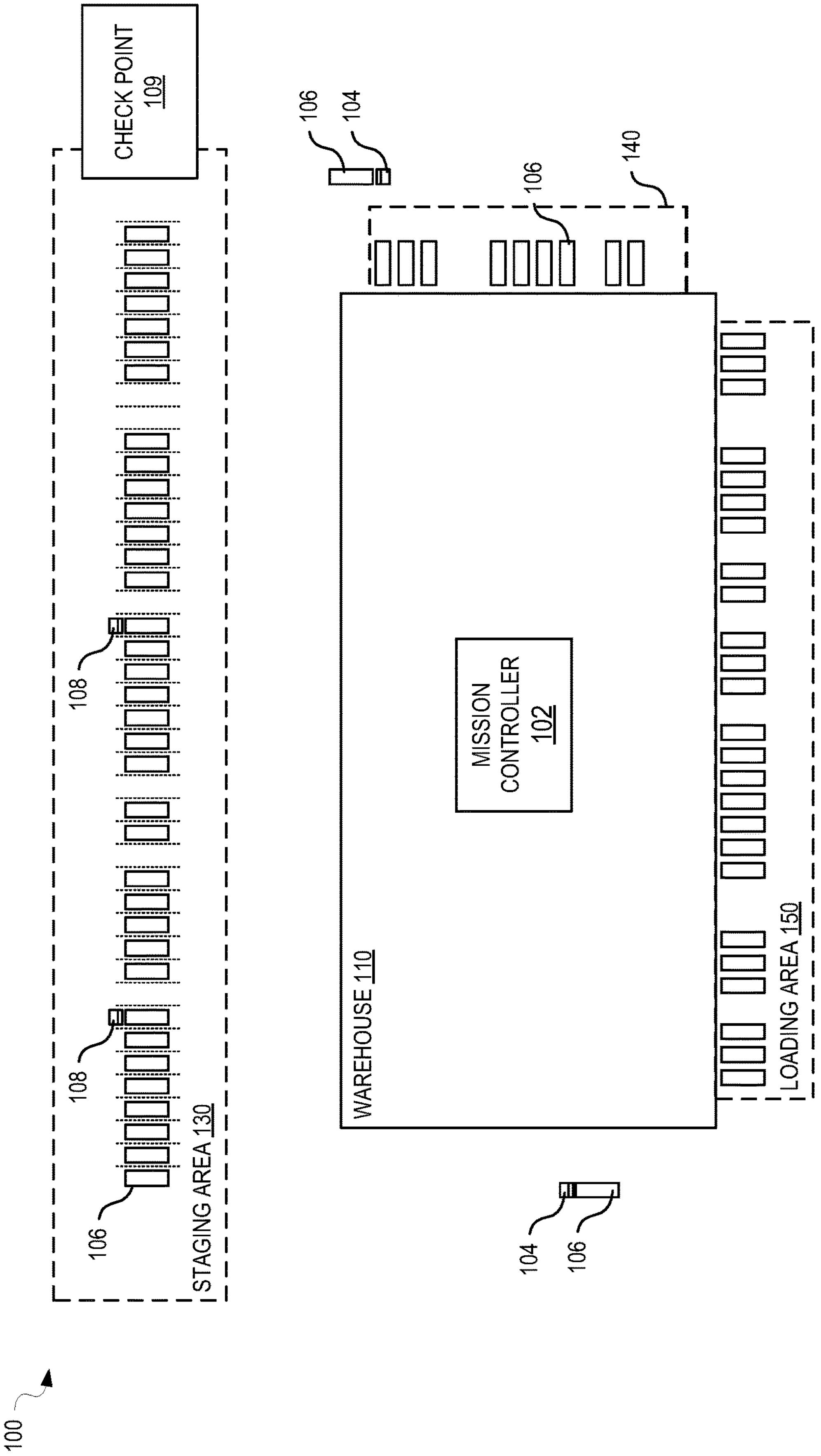
FIG. 1 is an aerial view showing one example autonomous yard that uses an autonomous tractor to move trailers between a staging area and loading docks of a warehouse, in embodiments.

FIG. 1 is an aerial view showing one example autonomous yard 100 (e.g., a goods handling facility, shipping facility, etc.) that uses an autonomous electric tractor 104 to move trailers 106 between a staging area 130 and loading docks of a warehouse 110. For example, an over-the-road (OTR) tractors 108 deliver goods-laden trailers 106 from remote locations and retrieve trailers 106 for return to such locations (or elsewhere-such as a storage depot). In a standard operational procedure, OTR tractor 108 arrives with trailer 106 and checks-in at a facility entrance checkpoint 109. A guard/attendant enters information (e.g., trailer number or QR (ID) code scan-embedded information already in the system, which would typically include: trailer make/model/year/service connection location, etc.) into a mission controller 102 (e.g., a computer software server that may be located offsite, in the cloud, fully onsite, or partially located within a facility building complex, shown as a warehouse 110). Warehouse 110 includes perimeter loading docks (located on one or more sides of the building), associated (typically elevated) cargo portals and doors, and floor storage, all arranged in a manner familiar to those of skill in shipping, logistics, and the like.

By way of a simplified operational example, after arrival of OTR tractor 108 and trailer 106, the guard/attendant at checkpoint 109 directs the driver to deliver trailer 106 to a specific numbered parking space in a designated staging area 130, which may include a large array of side-by-side trailer parking locations, arranged as appropriate for the facility's overall layout.

Once the driver has parked the trailer in the designated parking space of the staging area 130, he/she disconnects the service lines and ensures that connectors are in an accessible position (i.e. if adjustable/sealable), and decouples OTR tractor 108 from trailer 106. If trailer 106 is equipped with swing doors, this can also provide an opportunity for the driver to unlatch and clip trailer doors in the open position, if directed by yard personnel to do so.

At some later time, (e.g., when warehouse is ready to process the loaded trailer) mission controller 102 directs (e.g., commands or otherwise controls) tractor 104 to automatically couple (e.g., hitch) with trailer 106 at a pick-up spot in staging area 130 and move trailer 106 to a drop-off spot at an assigned unloading dock in unloading area 140 for example. Accordingly, tractor 104 couples with trailer 106 at the pick-up spot, moves trailer 106 to unloading area 140, and then backs trailer 106 into the assigned loading dock at the drop-off spot such that the rear of trailer 106 is positioned in close proximity with the portal and cargo doors of warehouse 110. The pick-up spot and drop-off spot may be any designated trailer parking location in staging area 130, any loading dock in unloading area 140, and any loading dock within loading area 150.

Manual and/or automated techniques are used to offload the cargo from trailer 106 and into warehouse 110. During unloading, tractor 104 may remain hitched to trailer 106 or may decouple (e.g., unhitch) to perform other tasks. After unloading, mission controller 102 directs tractor 104 to move trailer 106 from a pick-up spot in unloading area 140 and to a drop-off spot, either returning trailer 106 to staging area 130 or delivering trailer 106 to an assigned loading dock in a loading area 150 of warehouse 110, where trailer 106 is then loaded. Once loaded, mission controller 102 directs tractor 104 to move trailer 106 from a pick-up spot in loading area 150 to a drop-off spot in staging area 130 where it may await collection by another (or the same) OTR tractor 108. Given the pick-up spot and the drop-off spot, tractor 104 may autonomously move trailer 106.

Figure 2:
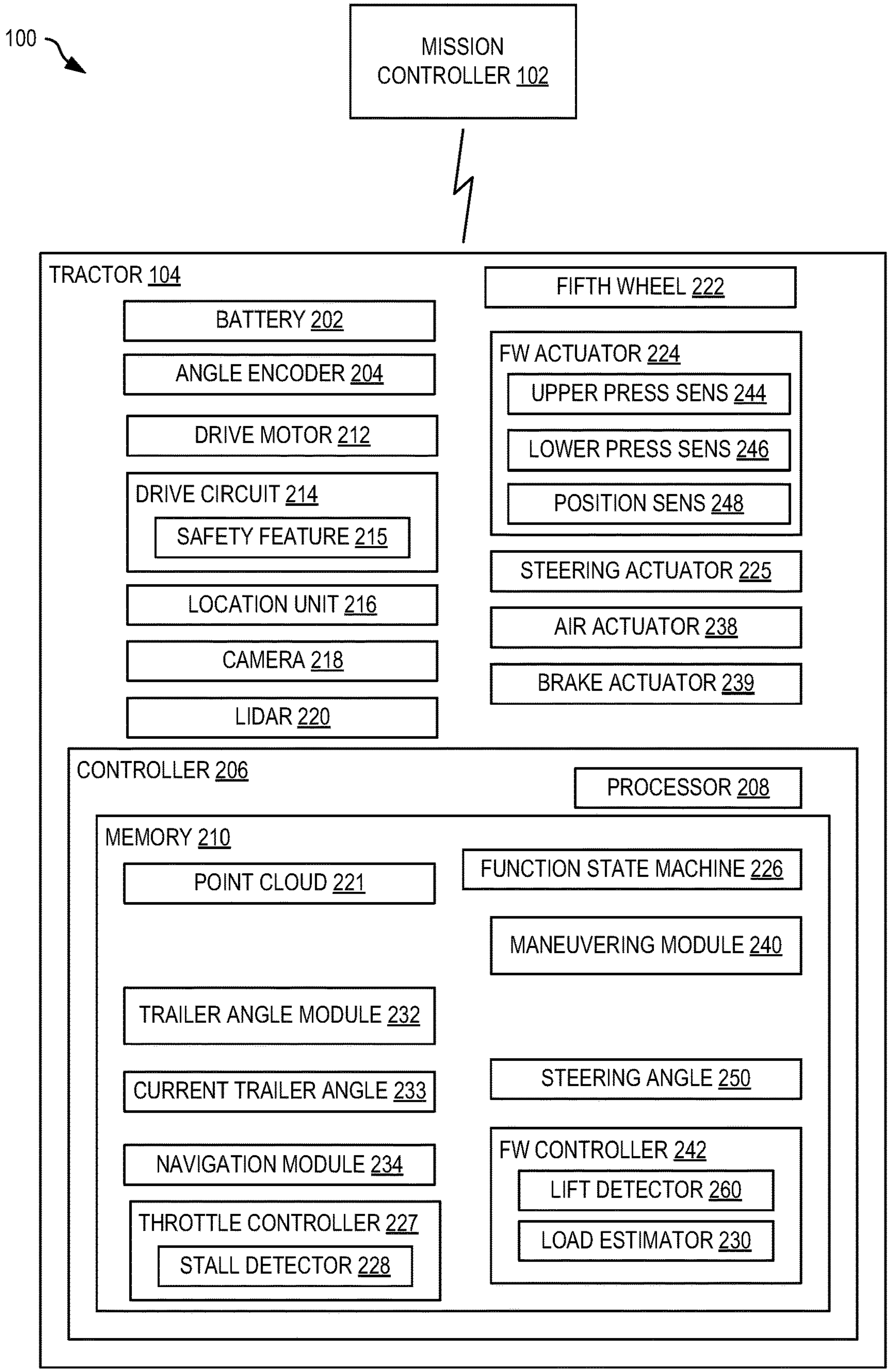
FIG. 2 is a block diagram illustrating key functional components of the tractor of FIG. 1, in embodiments.

FIG. 2 is a block diagram illustrating key functional components of tractor 104 of FIG. 1. Tractor 104 includes a battery 202 for powering components of tractor 104 and a controller 206 with at least one digital processor 208 communicatively coupled with memory 210 that may include one or both of volatile memory (e.g., RAM, SRAM, etc.) and non-volatile memory (e.g., PROM, FLASH, Magnetic, Optical, etc.). Memory 210 stores a plurality of software modules including machine-readable instructions that, when executed by the at least one processor 208, cause the at least one processor 208 to implement functionality of tractor 104 as described herein to operate autonomously within autonomous yard 100 under direction from mission controller 102.

Tractor 104 also includes at least one drive motor 212 controlled by a drive circuit 214 to mechanically drive a plurality of wheels (not shown) to maneuver tractor 104. Drive circuit 214 includes a safety feature 215 that deactivates motion of tractor 104 when it detects that rotation of drive motor 212 is impeded (e.g., stalled) and that drive motor 212 is drawing a current of six-hundred amperes, or more, for a predetermined period (e.g., five seconds). Safety feature 215 may thereby prevent damage to tractor 104 and/or other objects around tractor 104 when tractor 104 is impeded by an object. Safety feature 215 is described above with respect to an electric tractor. It should be appreciated that a similar safety feature could be included for diesel-based tractors, such as reducing engine power when an RPM threshold goes above a pre-set threshold. When safety feature 215 is tripped, tractor 104 requires manual reactivation before being able to resume movement. Accordingly, tripping safety feature 215 is undesirable.

Tractor 104 also includes a location unit 216 (e.g., a GPS receiver) that determines an absolute location and orientation of tractor 104, a plurality of cameras 218 for capturing images of objects around tractor 104, and at least one Light Detection and Ranging (LIDAR) device 220 (hereinafter LIDAR 220) for determining a point cloud about tractor 104. Location unit 216, the plurality of cameras 218, and the at least one LIDAR 220 cooperate with controller 206 to enable autonomous maneuverability and safety of tractor 104. Tractor 104 includes a fifth wheel (FW) 222 for coupling with trailer 106 and a FW actuator 224 controlled by controller 206 to position FW 222 at a desired height. In certain embodiments, FW actuator 224 includes an electric motor coupled with a hydraulic pump that drives a hydraulic piston that moves FW 222. However, FW actuator 224 may include other devices for positioning FW 222 without departing from the scope hereof. Tractor 104 may also include an air actuator 238 that controls air supplied to trailer 106 and a brake actuator 239 that controls brakes of tractor 104 and trailer 106 when connected thereto via air actuator 238.

Controller 206 also includes a trailer angle module 232 that determines a current trailer angle 233 between tractor 104 and trailer 106 based on one or both of a trailer angle measured by an optical encoder 204 positioned near FW 222 and mechanically coupled with trailer 106 and a point cloud 221 captured by the at least one LIDAR 220.

Controller 206 also includes a throttle controller 227 that controls drive circuit 214 and includes a stall detector 228 that detects when drive motor 212 stalls. Controller 206 may also include FW controller 242 that implements a lift detector 260 for detecting when landing gear of trailer 106 is lifted off the ground, and a load estimator 230 for estimating the weight imparted by trailer 106 onto FW 222.

Controller 206 may implement a function state machine 226 that controls operation of tractor 104 based upon commands (requests) received from mission controller 102. For example, mission controller 102 may receive a request (e.g., via an API, and/or via a GUI used by a dispatch operator) to move trailer 106 from a first location (e.g., slot X in staging area 130) to a second location (e.g., loading dock Y in unloading area 140). Once this request is validated, mission controller 102 invokes a mission planner (e.g., a software package, not shown) that computes a 'mission plan' for each tractor 104. For example, the mission plan is an ordered sequence of high-level primitives to be followed by tractor 104, in order to move trailer 106 from location X to location Y. The mission plan may include primitives such as drive along a first route, couple with trailer 106 in parking location X, drive along a second route, back trailer 106 into a loading dock, and decouple from trailer 106.

Function state machine 226 includes a plurality of states, each associated with at least one software routine (e.g., machine-readable instructions) that is executed by processor 208 to implements a particular function of tractor 104. Function state machine 226 may transitions through one or more states when following the primitives from mission controller 102 to complete the mission plan.

Controller 206 may also include an articulated maneuvering module 240, implemented as machine-readable instructions that, when executed by processor 208, cause processor 208 to controls drive circuit 214 and steering actuator 225 to maneuver tractor 104 based on directives from mission controller 102.

Controller 206 may also include a navigation module 234 that uses location unit 216 to determine a current location and orientation of tractor 104. Navigation module 234 may also use other sensors (e.g., camera 218 and/or LIDAR 220) to determine the current location and orientation of tractor 104 using dead-reckoning techniques.

Figure 3:
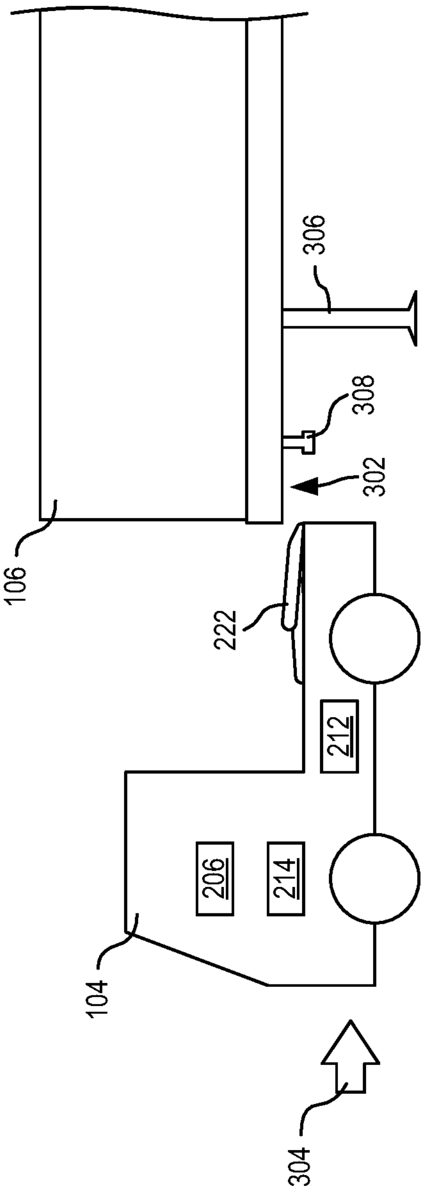
FIG. 3 is a side elevation showing the tractor of FIG. 1 reversing under a lower surface of the trailer, in embodiments.
Figure 4:
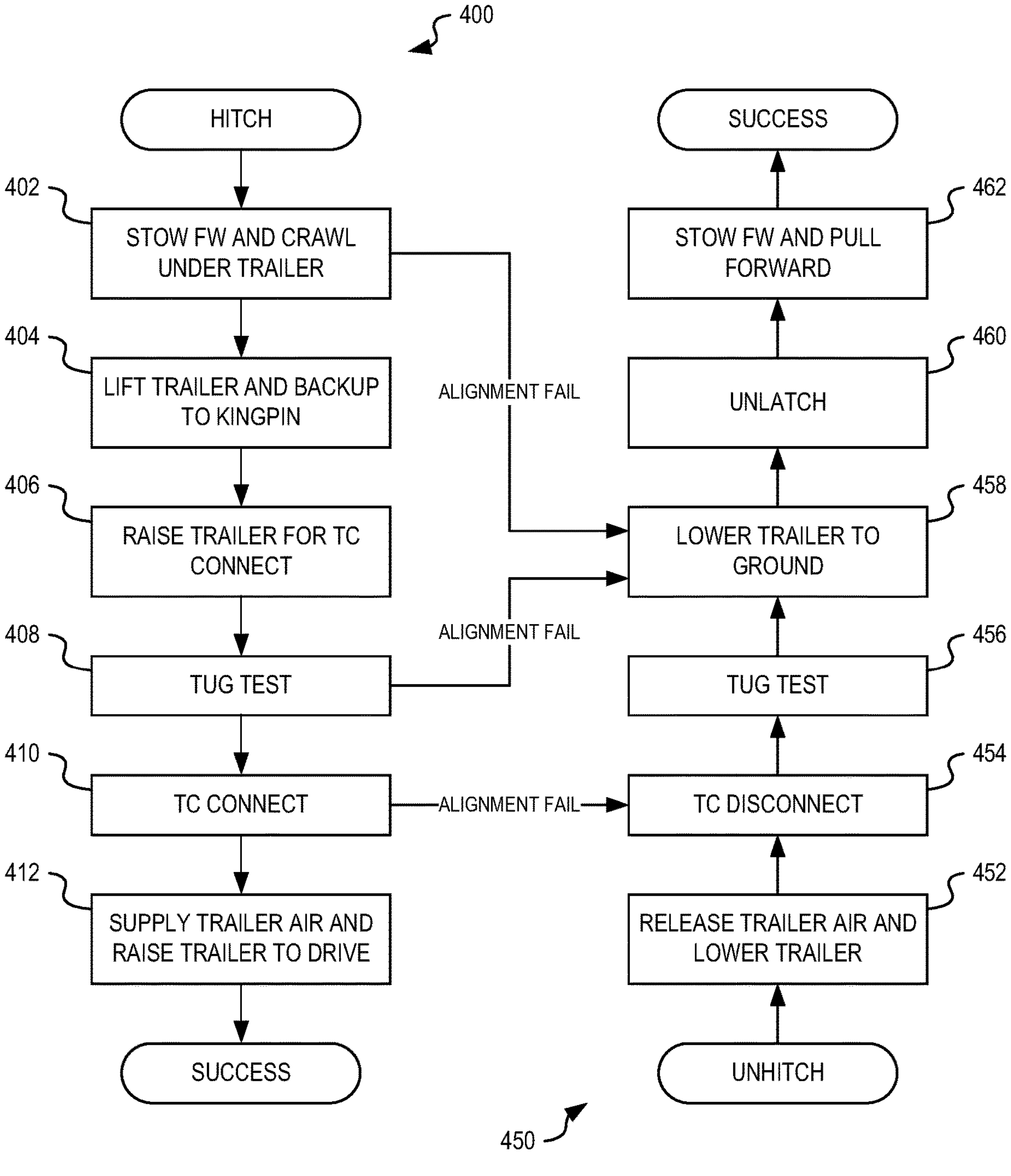
FIG. 4 shows example hitch and unhitch sequence of states implemented by a function state machine of FIG. 2, for coupling and uncoupling the tractor and the trailer, in embodiments.

FIG. 3 is a side elevation showing tractor 104 of FIG. 1 reversing under a lower surface 302 of trailer 106. FIG. 4 shows one example hitch sequence 400 of states implemented by function state machine 226 of tractor 104, FIGS. 1-3, for coupling tractor 104 with trailer 106, and one example unhitch sequence 450 of states implemented by function state machine 226 for decoupling tractor 104 from trailer 106. FIG. 4 also shows example transitions between sequences when alignment fail is detected (e.g., when an activity of the current state fails for some reason), which allows function state machine 226 to recover from the failure (e.g., undo certain actions) and to reattempt the command. FIGS. 3 and 4 are best viewed together with the following description.

As shown in FIG. 3, landing gear 306 of trailer 106 is sufficiently extended such that a lower surface 302 (e.g., a FW plate) of a front end of trailer 106 is high enough above ground level to allow FW 222, when fully retracted, to be pushed thereunder without stalling drive motor 212 of tractor 104. That is, drive motor 212 provides sufficient force to push FW 222 under lower surface 302. However, landing gear 306 is extended by a driver of OTR tractor 108 when leaving trailer 106 in staging area 130 of autonomous yard 100, and therefore the height of lower surface 302 is at the discretion of the driver and may not be consistent between trailers 106. Further, the force required to move FW 222 under lower surface 302 is also dependent upon a weight (e.g., of goods) at the front end of trailer 106. When drive motor 212 is unable to provide sufficient force to push FW 222 beneath lower surface 302, such as when landing gear 306 is not sufficiently extended (see FIG. 8), drive motor 212 stalls.

In response to receiving a hitch command from mission controller 102, once tractor 104 is aligned with trailer 106, controller 206, in state 402, stows FW 222 and controls drive circuit 214 to move tractor 104 slowly backwards as indicated by arrow 304. When controller 206 detects that FW 222 is beneath lower surface 302 of trailer 106, drive motor 212 is stopped and function state machine 226 transitions to state 404. If controller 206 determines that tractor 104 is not correctly aligned with trailer 106, function state machine 226 transitions to state 458 of unhitch sequence 450 such that another attempt may be made. In state 404, controller 206 controls FW actuator 224 to lift trailer 106 and controls drive circuit 214 to back tractor 104, and thus FW 222, up to a kingpin 308 of trailer 106. In state 406, controller 206 controls FW actuator 224 to raise FW 222 and thereby lift the front end of trailer 106 for Trailer Connect (e.g., a process of connecting air lines/electrical from tractor 104 to trailer 106 using gladhand ID and orientation). In state 408, controller 206 controls drive circuit 214 to perform a tug test. If controller 206 determines that tractor 104 is not correctly coupled with trailer 106 (e.g., the kingpin did not latch), function state machine 226 transitions to state 458 of unhitch sequence 450 such that another attempt may be made. In state 410, controller 206 controls trailer air actuator 238 to perform the TC connect. If controller 206 determines that the TC did not connect successfully, function state machine 226 transitions to state 454 of unhitch sequence 450 such that another attempt may be made. In state 412, controller 206 controls trailer air actuator 238 to supply trailer air and controls FW actuator 224 to raise FW 222 higher to ensure that the trailer landing gear clears the ground in preparation to drive.

In response to receiving an unhitch command from mission controller1 102, once trailer 106 is correctly positioned, controller 206, in state 452, controls trailer air actuator 238 to release trailer air and controls FW actuator 224 to lower FW 222 and the front end of trailer 106. In state 454, controller 206 controls trailer air actuator 238 to disconnect the TC from trailer 106. In state 456, controller 206 controls drive circuit 214 to move tractor 104 forward to perform a tug test. In state 458, controller 206 controls FW actuator 224 to lower the front end of trailer 106 to the ground. In state 460, controller 206 controls FW actuator 224 to unlatch from the trailer kingpin. In state 462, controller 206 controls FW actuator 224 to stow FW 222 and controls drive circuit 214 to cause tractor 104 to move forward away from trailer 106.

Figure 5:
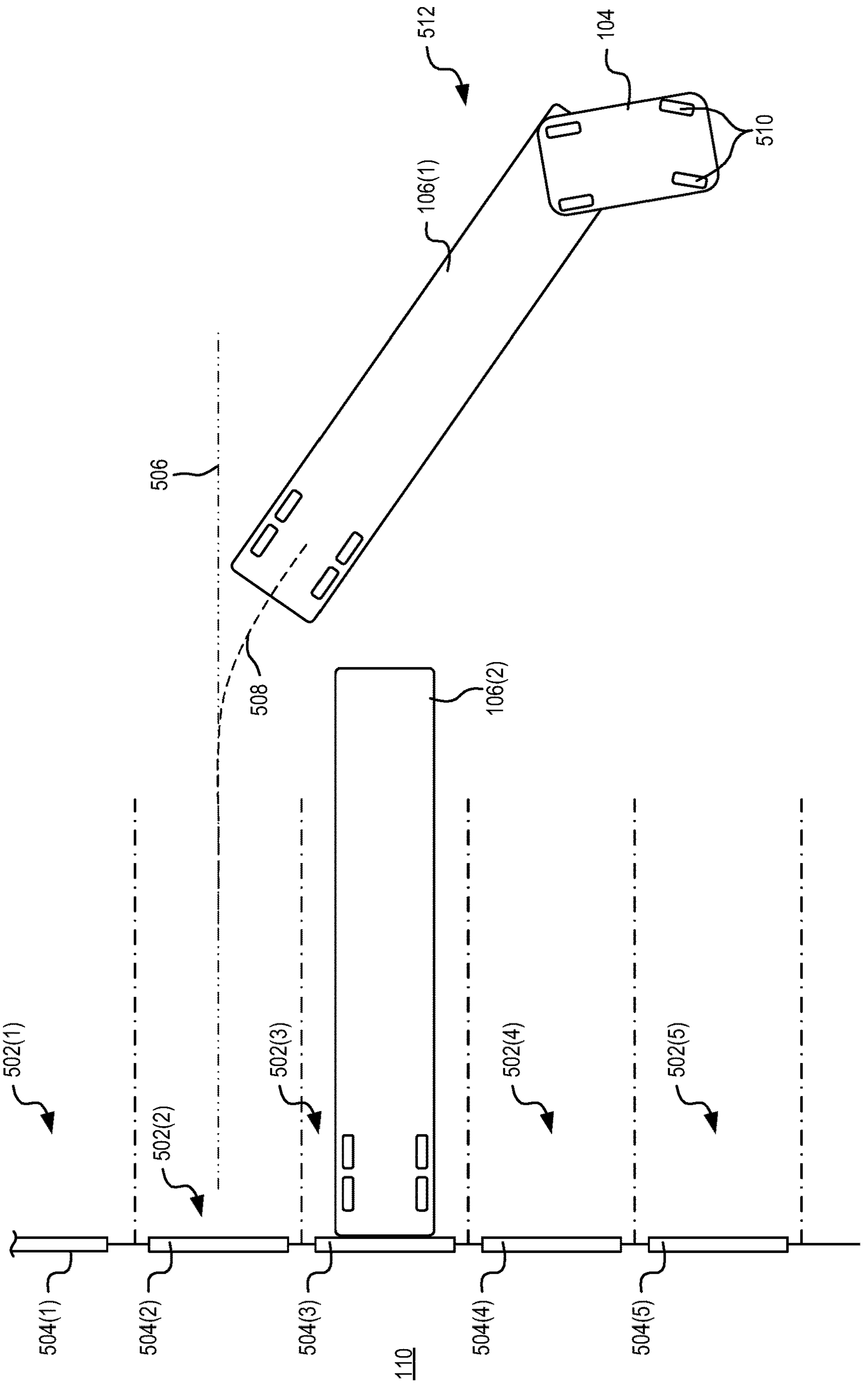
FIG. 5 is a schematic plan view illustrating the tractor of FIGS. 1-3 backing the trailer up to one of a plurality of adjacent loading docks of the warehouse of FIG. 1, in embodiments.

FIG. 5 is a schematic plan view illustrating tractor 104 backing trailer 106 up to one loading dock 502(2) of a plurality of adjacent loading docks 502(1)-(5) of warehouse 110. Tractor 104 coupled with trailer 106 may be referred to as vehicle 512. Each loading dock 502(1)-(5) has a corresponding loading door 504(1)-(5), and as shown, one trailer 106(2) is parked at loading dock 502(3). Since trailer doors are at the rear of trailer 106, trailer 106 is reversed up to loading dock 502 and is correctly aligned with loading door 504 to provide full and safe access to trailer 106. A reference path 506 may be defined for loading dock 502(2) to facilitate alignment of trailer 106(1) into loading dock 502(2). Maneuvering module 240 may predict a path 508 of trailer 106(1) when determining a steering angle 250 for steering wheels 510 of tractor 104.

Figure 6:
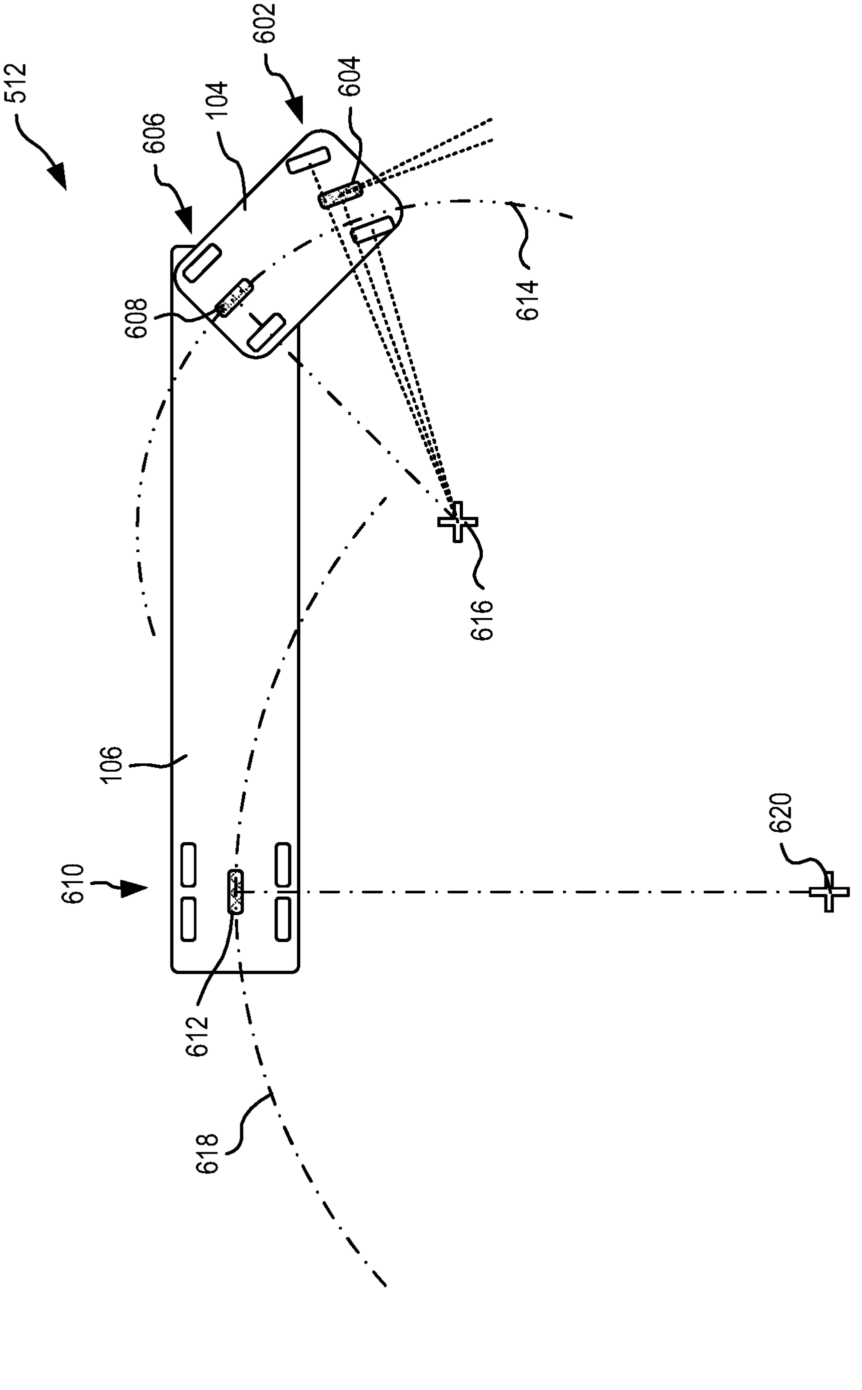
FIG. 6 is a schematic showing example assumptions made by the tractor when determining a steering angle for controlling the tractor to reverse the trailer, in embodiments.

FIG. 6 is a schematic showing example assumptions made by maneuvering module 240 of tractor 104 when determining steering angle 250 for controlling tractor 104 to reverse trailer 106. For purposes of simplification, tractor 104 and trailer 106 are approximated in a kinematic bicycle model with nonholonomic constraints. A front axle 602 of tractor 104 is approximated by a single steerable modelled wheel 604 at the axle's center, a rear axle 606 of tractor 104 is approximated by a single non-steering modelled wheel 608 at the axle's center, and tandem 610 of trailer 106 is approximated as a single non-steering modelled wheel 612 centered in between both axles of tandem 610. This simplified representation of tractor 104 and trailer 106 allows any complex dynamic interactions between the actual wheels to be ignored and the nonholonomic constraint implies that none of the actual wheels move laterally. As shown in FIG. 6, tractor 104 is assumed to move along a circle 614 perpendicular to non-steering modelled wheel 608 about a tractor center of rotation 616, and trailer 106 is assumed to travel along a circle 618 perpendicular to non-steering modelled wheel 612 about a trailer center of rotation 620. This assumption is generally safe when tractor 104 and trailer 106 are moving at low speed (e.g., less than 15 miles-per-hour). Further assumptions include: tires do not deform, tires along an axle are properly aligned, and motion of the steering wheels of front axle 602 is approximated by the average angle the wheels.

However, to accurately back trailer 106 into loading dock 502(2), tractor 104 requires accurate knowledge of the position of the back end of trailer 106, and non-steering modelled wheel 612, relative to tractor 104.

Motor Stall Prevention

Figure 7:
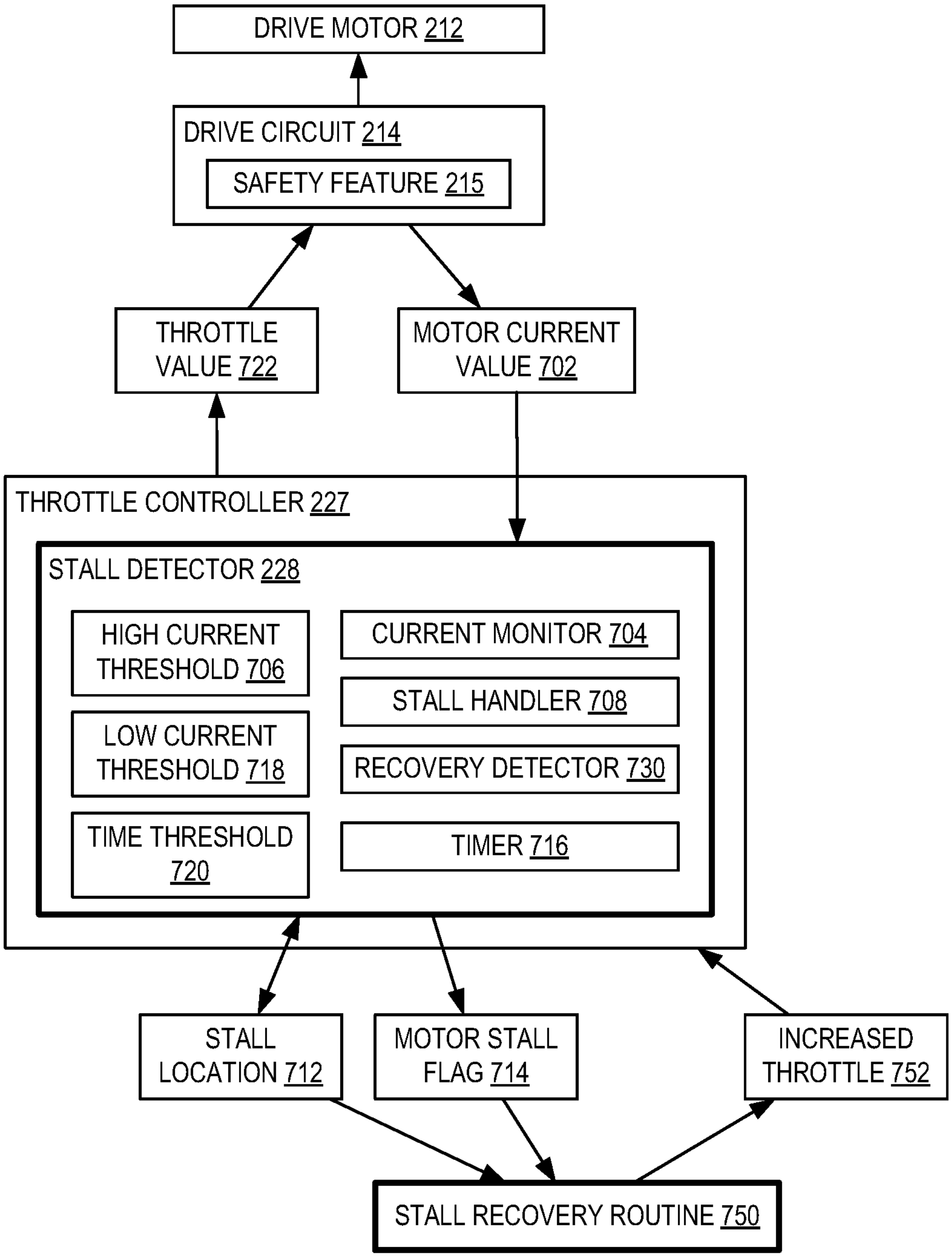
FIG. 7 shows the stall detector of the controller of the tractor of FIG. 2 in further example detail, in embodiments.

FIG. 7 shows stall detector 228 of controller 206, FIG. 2, in further example detail. As noted above, deactivation of tractor 104 by safety feature 215 is undesirable, since a goal of autonomous yard 100 is to not require personnel movement within autonomous yard 100. Throttle controller 227 commands drive circuit 214 with a nominal throttle value 722 to maneuver tractor 104. For example, throttle controller 227 cycles at fifty hertz, determines a throttle value 722 based on requests from other modules (e.g., maneuvering module 240) and other factors (e.g., retry attempts, etc.), and sends throttle value 722 to drive circuit 214. However, certain maneuvers, such as coupling with a trailer, occasionally result in a stall of drive motor 212 when a height of landing gear 306 is insufficient to allow FW 222 of tractor 104 to slide under lower surface 302 of trailer 106. Accordingly, stall detector 228 operates to prevent safety feature 215 from being triggered. Advantageously, by detecting when drive motor 212 stalls, stall detector 228 provides additional status information that may be used by controller 206 to control movement of tractor 104. For example, when stall detector 228 detects drive motor 212 stalling while tractor 104 is coupling with trailer 106, the stall may indicate that tractor 104 is stuck at a front edge of trailer 106. In another example, when stall detector 228 detects drive motor 212 stalling while tractor 104 is reversing trailer 106 up to dock 502, the stall may indicate that the back end of trailer 106 is pressing against dock pads at dock 502. In another example, when stall detector 228 detects drive motor 212 stalling while tractor 104 is traversing an apron of autonomous yard 100 (e.g., when moving trailer 106 between staging area 130, unloading area 140, and loading area 150), the stall may indicate that tractor 104 and/or trailer 106 is blocked by an obstruction such as one or more of a lump of ice, dropped debris, a lip/curb/bump/pothole in the pavement, and so on.

Using the coupling (hitching) function of tractor 104 with trailer 106 as an example, as shown in FIG. 3, when landing gear 306 of trailer 106 are sufficiently extended, a lower surface 302 (e.g., a FW plate) of trailer 106 is high enough above ground level to allow FW 222 of tractor 104 to be pushed thereunder without stalling drive motor 212. That is, at nominal throttle value 722, drive motor 212 provides sufficient force to push FW 222 under lower surface 302 to engage kingpin 308. However, landing gear 306 is extended by the driver of OTR tractor 108 when leaving trailer 106 in staging area 130 of autonomous yard 100, and therefore the height of lower surface 302 is at the discretion of the driver and may not be consistent between different trailers. Further, the force required to move FW 222 under lower surface 302 is also dependent upon the weight of goods carried by trailer 106, particularly as loaded at a front end of trailer 106.

Figure 8:
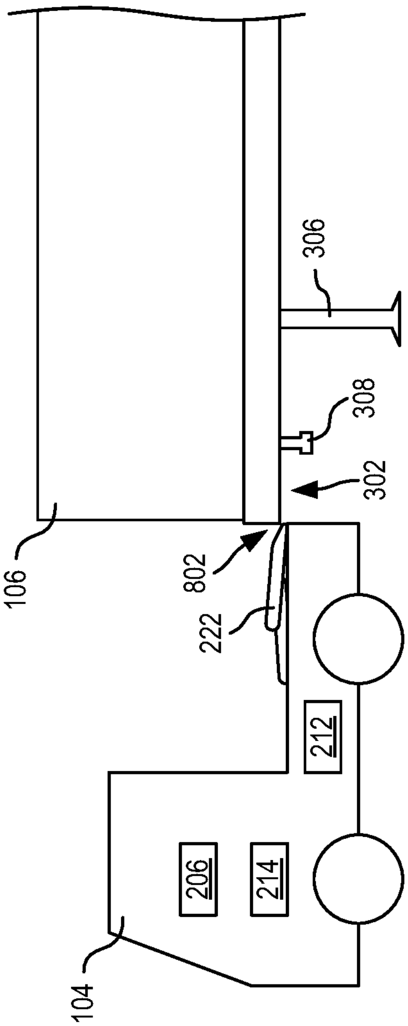
FIG. 8 is a side elevation showing the tractor of FIGS. 1-3 attempting to reverse under a lower surface of the trailer, where the landing gear is not sufficiently extended, in embodiments.
Figure 9:
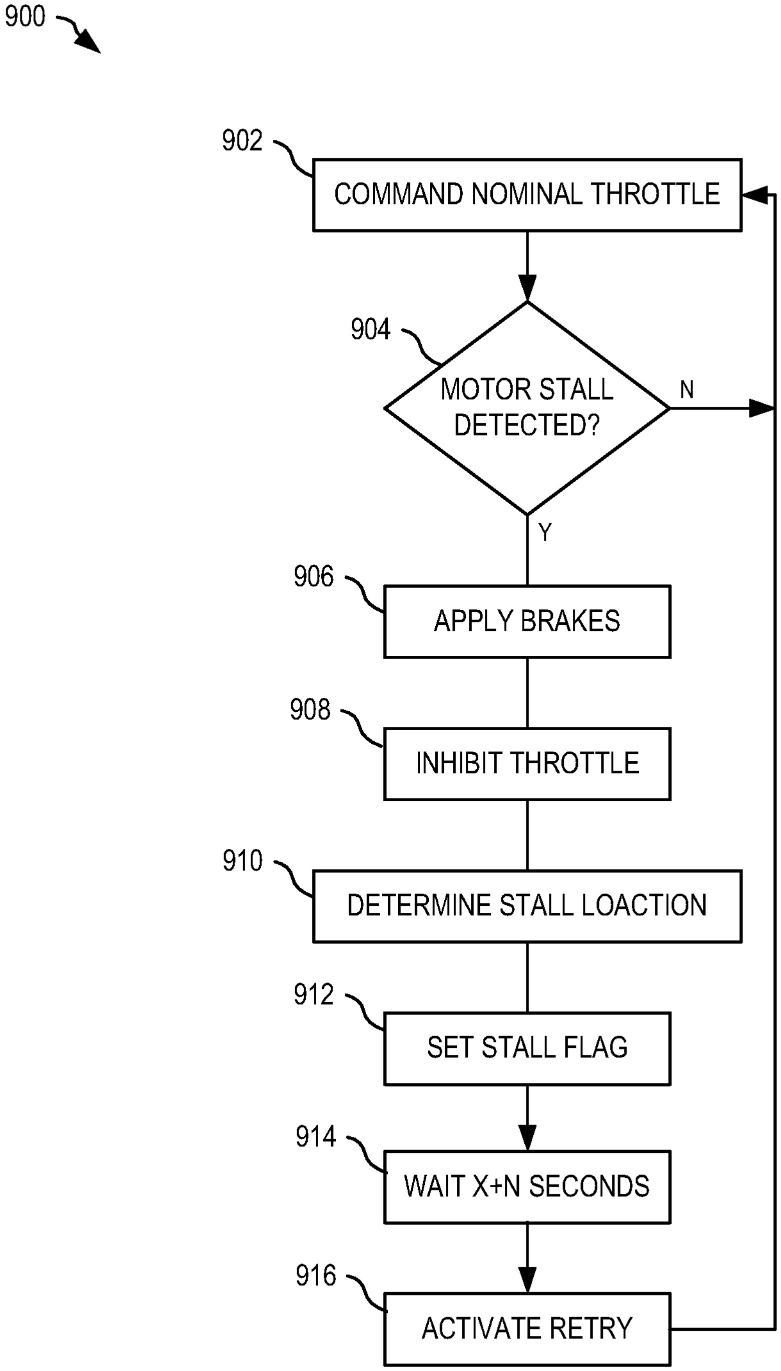
FIG. 9 is a flowchart illustrating one example method for detecting and preventing stall of the drive motor of the tractor of FIGS. 1-3, in embodiments.

FIG. 8 is a side elevation showing tractor 104 attempting to reverse under lower surface 302 of a trailer 106, where landing gear 306 is not sufficiently extended, resulting in FW 222 getting stuck at a front edge 802 of trailer 106, and drive motor 212 stalling. FIG. 9 is a flowchart illustrating one example method 900 for detecting and preventing stall of drive motor 212 of tractor 104. Method 900 is implemented, at least in part, within stall detector 228 of FIG. 7. FIGS. 7, 8 and 9 are best viewed together with the following description.

Stall detector 228 receives, a motor current value 702 indicative of electrical current flowing through drive motor 212 from drive circuit 214 at intervals or substantially continuously. For example, motor current value 702 may be received from drive circuit 214 via a CAN bus of tractor 104. Stall detector 228 includes a current monitor 704 that compares motor current value 702 against a high current threshold 706 and determines that drive motor 212 is stalling when motor current value 702 is equal to, or greater than, high current threshold 706 for a predefined period (e.g., 4.5 seconds). When current monitor 704 determines that drive motor 212 is stalling, current monitor 704 invokes a stall handler 708, implemented as software, to initiate one or more actions for tractor 104 in response to the stall detection. In certain embodiments, stall handler 708 controls brake actuator 239 to apply brakes of tractor 104 and brakes of trailer 106 when coupled to tractor 104. Stall handler 708 also causes throttle controller 227 to request zero throttle, and effectively blocking other throttle inputs from being sent to drive circuit 214 and may determine a stall location 712 based on a current location of tractor 104 received from location unit 216 (e.g., GPS coordinates), and sets a motor stall flag 714. Stall handler 708 then restarts a timer 716 to allow drive motor 212 to cool down by inhibiting further throttle command of drive circuit 214 for at least a predefined time threshold 720. In certain embodiments, stall handler 708 may wait for current through drive motor 212 to drop below a low current threshold 718 before restarting timer 716.

Motor stall flag 714 may be evaluated by other software modules of controller 206, such that specific stall recovery actions may be taken in response to the detected motor stall. Accordingly, recovery from the detected motor stall is handled differently depending on a current state of function state machine 226 and the corresponding task being performed by tractor 104. For clarity of illustration, FIG. 7 shows a single stall recovery function 750, which may represent any one or more of many context-specific stall recovery routines implemented by controller 206. In the following example, stall recovery routine 750 implements recovery from a detected stall of drive motor 212 when tractor 104 is attempting to couple (hitch) with trailer 106.

Stall recovery routine 750 initiates when motor stall flag 714 is cleared by stall detector 228, such as when timer 716 reaches time threshold 720. Stall recovery routine 750 may track and limit a number of retry attempts in response to the stall detection. For example, stall recovery routine 750 may limit attempts to drive tractor 104 beneath trailer 106 to three. Continuing with the above coupling example, stall recovery routine 750 first controls tractor 104 to move forward a predefined distance (e.g., two meters). Then stall recovery routine 750 attempts to drive FW 222 beneath front edge 802 of trailer 106 using an increased throttle 752. Stall recovery routine 750 may request increased throttle 752 with a value that is increased above the nominal throttle value for the maneuver by a factor corresponding to the retry attempt number. For example, stall recovery routine 750 may add 20% throttle to each retry attempt until a maximum throttle setting is attempted. That is, when stall detector 228 detects a motor stall on a retry attempt, the following retry attempt increases the throttle further. The increased throttle setting causes tractor 104 to move at a higher speed towards the object or problem causing the stall to overcome the obstacle or problem.

In certain embodiments, stall detector 228 includes a recovery detector 730 that detects when a retry attempt has succeeded and returns commands the throttle to the nominal throttle value for the maneuver. For example, recovery detector 730 may compare a current location of tractor 104 to stall location 712, determining that the retry attempt was successful when tractor 104 moves past stall location 712 based upon a current movement direction of tractor 104, and immediately command nominal throttle. Advantageously, recovery detector 730 prevents tractor 104 from continuing to move at a high speed once the reason for the stall is overcome.

In one example of operation, in block 902, method 900 commands a nominal throttle. In one example of block 902, controller 206 sends a throttle value 722 to drive circuit 214. Block 904 is a decision. If, in block 904, method 900 determines that a motor stall is detected, method 900 continues with block 906; otherwise, method 900 continues with block 902. In one example of block 904, current monitor 704 receives motor current value 702 from drive circuit 214 and compares it to high current threshold 706.

In block 906, method 900 applies brakes. In one example of block 906, stall handler 708 commands brake actuator 239 to apply brakes of tractor 104. In block 908, method 900 inhibits throttle. In one example of block 908, stall handler 708 causes throttle controller 227 to command zero throttle. In block 910, method 900 determines a stall location. In one example of block 910, stall handler 708 determines stall location 712 using location unit 216. In block 912, method 900 sets a stall flag. In one example of block 912, stall handler 708 sets motor stall flag 714. In block 914, method 900 waits X+N seconds. In one example of block 914, stall handler 708 starts timer 716 and waits until it reaches a time threshold 720. In block 916, method 900 activates retry. In one example of block 916, stall handler 708 clears motor stall flag 714 to initiate stall recovery routine 750.

Lift Detection and Trailer Load Estimation

When tractor 104 is coupling (hitching) to trailer 106, it is important that FW 222 lifts trailer 106 before backing to kingpin. Tractor 104 uses FW 222 to lift the front end of trailer 106 to ensure that (a) FW 222 is aligned with kingpin 308 in the vertical direction (e.g., when FW 222 is in contact with the lower surface of trailer 106, FW 222 is vertically aligned to capture kingpin 308), and (b) that any force to trailer 106 on impact of FW 222 with kingpin 308 does not drag landing gear 306 over the ground (e.g., which may damage landing gear 306). For example, landing gear 306 may be set between 42 inches (1.067 m) and 51 inches (1.3 m) in height, however, the actual height is not measured.

Figure 10:
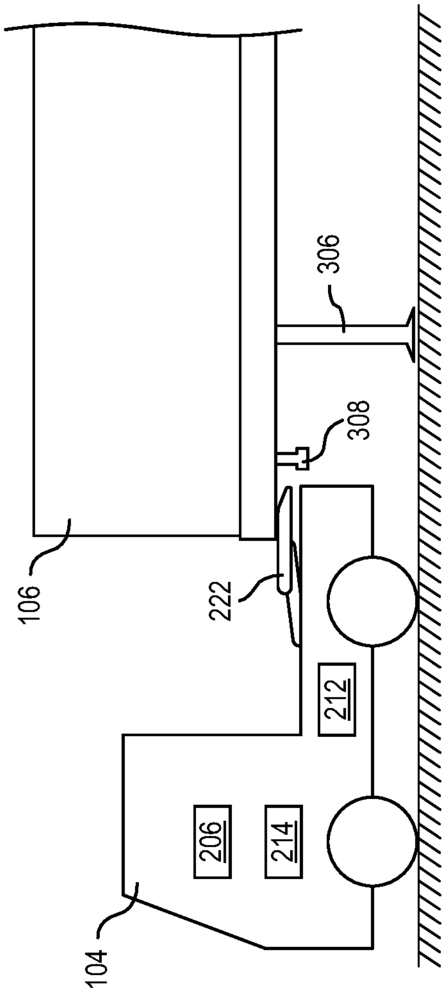
FIG. 10 shows the fifth-wheel (FW) of the tractor of FIGS. 1-3 lifting the front end of the trailer, in embodiments.
Figure 11:
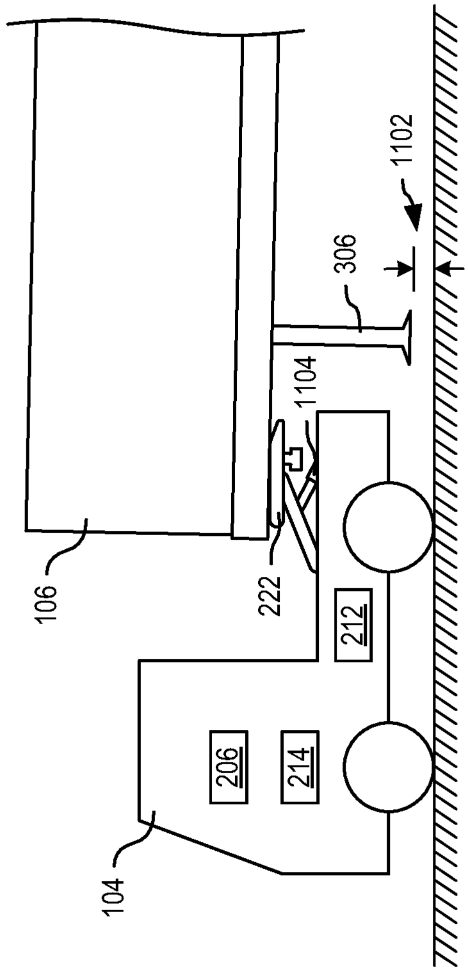
FIG. 11 shows the tractor of FIG. 10 coupled with the trailer and with the FW raised to provide the landing gear with a clearance above the ground, in embodiments.
Figure 12:
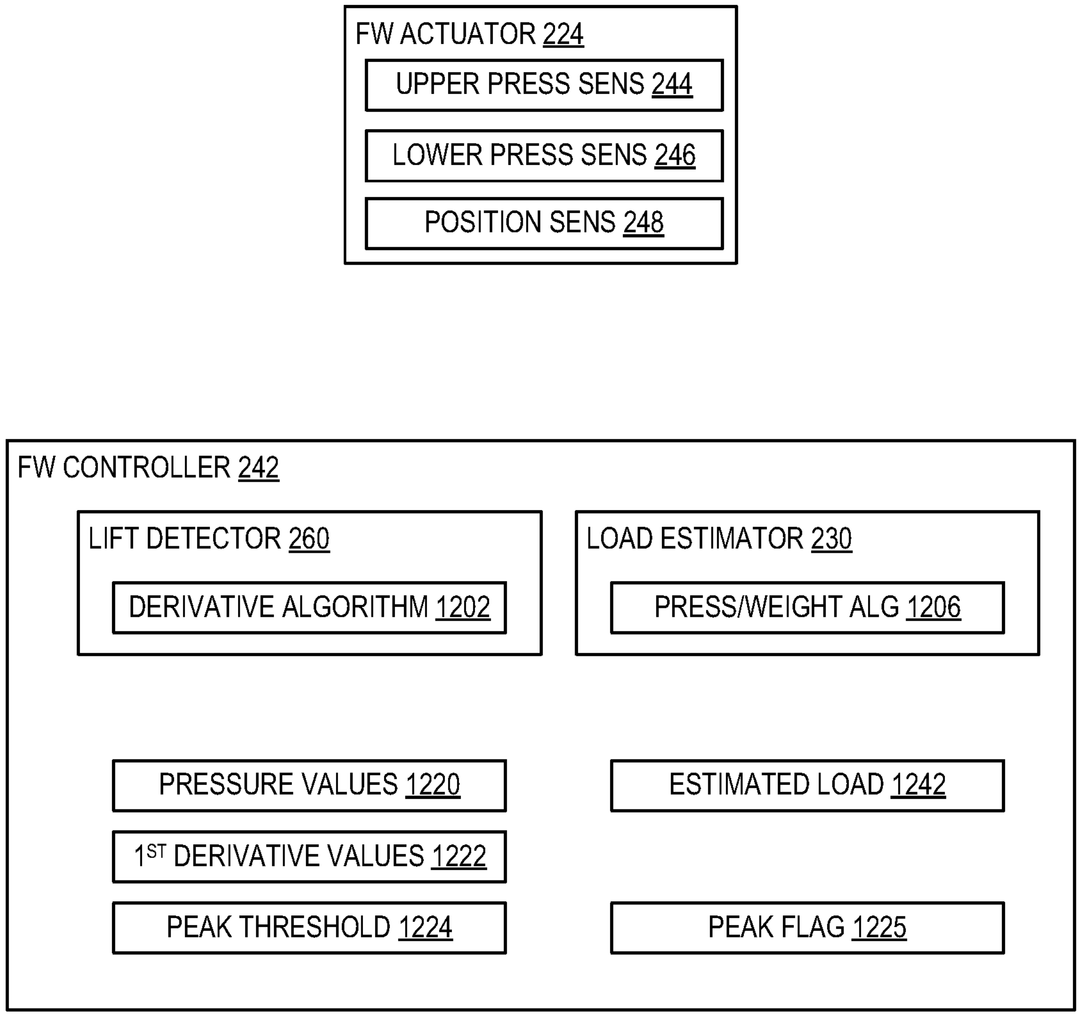
FIG. 12 shows the FW controller and the FW actuator of the tractor of FIGS. 10 and 11 in further example detail, in embodiments.

FIG. 10 shows FW 222 of tractor 104 lifting the front end of trailer 106 and aligning with the lower surface of trailer 106 and kingpin 308 prior to tractor 104 reversing to engage FW 222 with kingpin 308. FIG. 11 shows tractor 104 coupled with trailer 106 and with FW 222 raised to provide landing gear 306 with a clearance 1102 (e.g., six inches) above the ground. FIG. 12 shows the FW controller 242 and the FW actuator 224 of tractor 104 in further example detail. FIGS. 10-12 are best viewed together with the following description.

Since landing gear 306 is not retracted during maneuvering of trailer 106 by tractor 104, it is important that the front of trailer 106 is lifted such that clearance 1102 allows for variation in height of the ground being traversed by trailer 106. However, since the extension of landing gear 306 is not consistent, the height of FW 222 does not directly relate to clearance 1102. However, the front end of trailer 106 should not be lifted higher than needed, since (a) goods within trailer 106 may shift if the front end is lifted too high, and (b) lifting the front end of trailer 106 alters an angle formed at the back of trailer 106, which may prevent successful docking of trailer 106 at loading dock 502. Accordingly, it is useful to determine a height of FW 222 at which landing gear 306 lifts of the ground.

FW actuator 224 includes an upper pressure sensor 244 operable to measure a pressure in an upper chamber of a hydraulic piston 1104 that raises and lowers FW 222, and a position sensor 248 operable to provide feedback on a height of FW 222. FW actuator 224 may also include a lower pressure sensor 246 operable to measure a pressure in a lower chamber of the hydraulic piston. To raise FW 222, FW actuator 224 increases pressure (e.g., by pumping hydraulic fluid) in the upper chamber, and to lower FW 222, FW actuator 224 may increase pressure in the lower chamber and/or releasing pressure in the upper chamber. A differential between pressures measured by upper pressure sensor 244 and lower pressure sensor 246 may be used to estimate a force (e.g., a weight of the front end of trailer 106) pushing down onto FW 222.

To determine the height of landing gear 306 above the ground, lift detector 260 determines when landing gear 306 is initially lifted off the ground as FW 222 is raised. To detect when landing gear 306 is initially lifted off the ground, lift detector 260 calculates first derivative values 1222 (e.g., rate of change) of pressure values 1220 in the upper chamber as sensed by upper pressure sensor 244. A first rate of change in the sensed pressure is relatively constant prior to landing gear 306 leaving the ground (e.g., as FW 222 steadily increases a force applied to lift trailer 106). A second rate of change in the sensed pressure is relatively constant after landing gear 306 has left the ground (e.g., as FW 222 steadily lifts the front end of trailer 106). However, because the first rate of change is different from the second rate of change, as landing gear 306 lifts from the ground, the first derivative values 1222 peak. Lift detector 260 detects when first derivative values 1222 peak as landing gear 306 is lifted off the ground.

Figure 13:
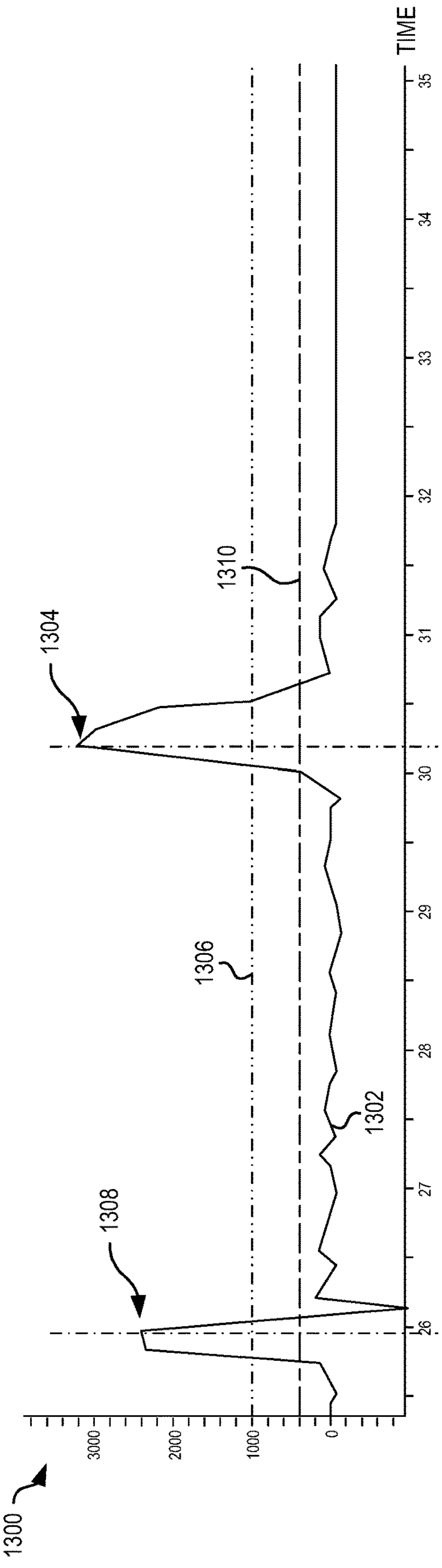
FIG. 13 is a graph plotting a first derivative value against time, where a line represents a first derivative of pressure sensed by an upper pressure sensor as the FW actuator pumps hydraulic fluid into the hydraulic piston to raise the FW, in embodiments.
Figure 14:
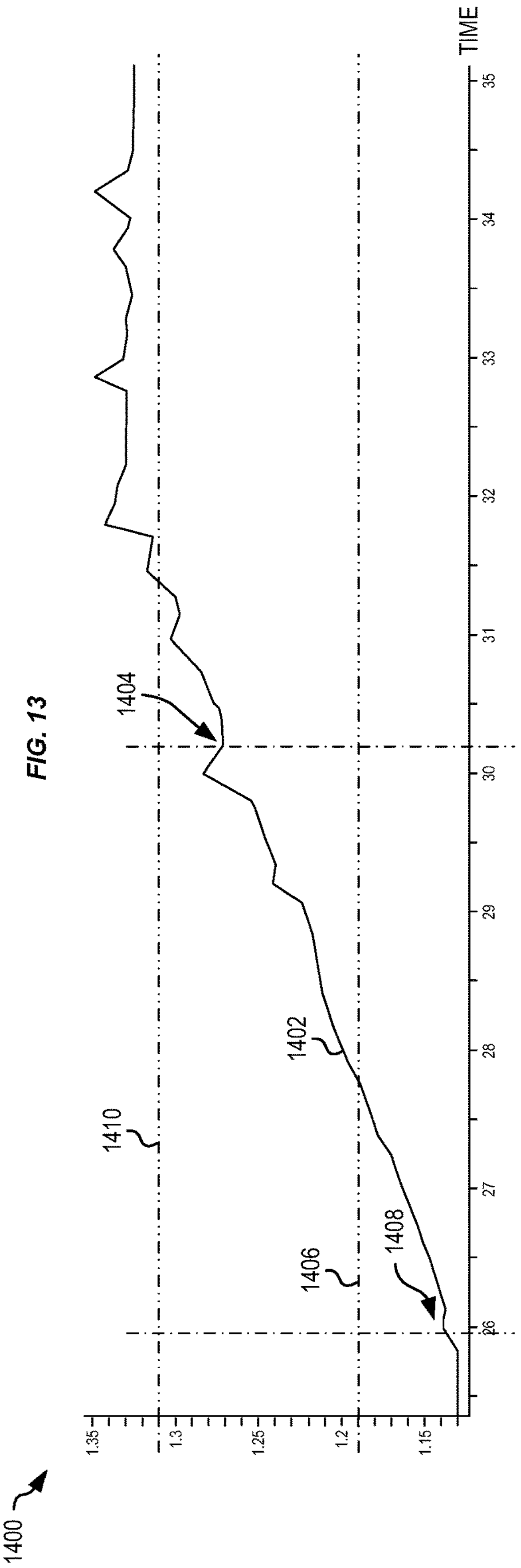
FIG. 14 is a graph plotting height against time, where a line represents height of the FW sensed by the position sensor of the FW actuator, in embodiments.
Figure 15:
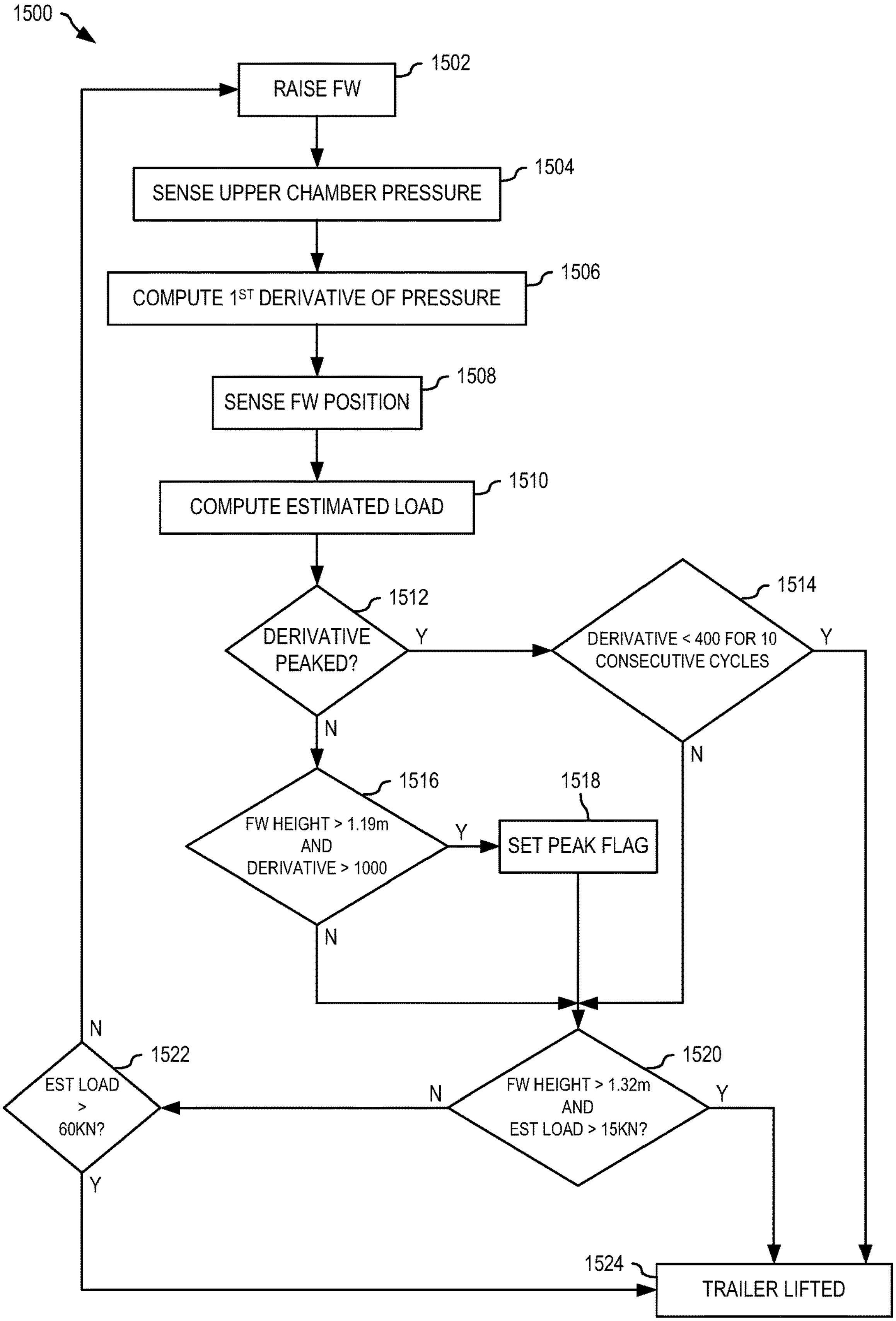
FIG. 15 is a flowchart illustrating one example method for sensing pressure values, calculating first derivative values, detecting a peak in the first derivative values, and lifting the trailer, in embodiments.

FIG. 13 is a graph 1300 plotting a first derivative value against time, where a line 1302 represents a first derivative of pressure sensed by upper pressure sensor 244 as FW actuator 224 pumps hydraulic fluid into the hydraulic piston to raise FW 222. FIG. 14 is a graph 1400 plotting height against time, where line 1402 represents height of FW 222 sensed by position sensor 248 of FW actuator 224. FIG. 15 is a flowchart illustrating one example method 1500 for sensing pressure values 1220, calculating first derivative values 1222, detecting a peak in first derivative values 1222, and determining a corresponding height of FW 222 to lift trailer 106. Method 1500 is implemented at least in part in load estimator 230 of controller 206 for example. FIGS. 12-15 are best viewed together with the following description.

In one example of operation, when trailer 106 is coupled with, or is coupling with, tractor 104 (e.g., FW 222 is at least positioned beneath a front end of trailer 106), controller 206 invokes lift detector 260 to lift trailer 106. In block 1502, method 1500 raises the FW. In one example of block 1502, lift detector 260 controls FW actuator 224 to raise FW 222. In block 1504, method 1500 senses the upper chamber pressure. In one example of block 1504, lift detector 260 reads a pressure value 1220 from upper pressure sensor 244. In block 1506, method 1500 computes a $1^{st}$ derivative of the pressure. In one example of block 1506, lift detector 260 uses derivative algorithm 1202 to determine $1^{st}$ derivative value 1222 from pressure value 1220. In block 1508, method 1500 senses a FW position. In one example of block 1508, lift detector 260 determines a current height of FW 222 by reading position sensor 248. In block 1510, method 1500 computes an estimated load. In one example of block 1510, lift detector 260 invokes load estimator 230 to calculate a load on FW 222 based on pressure value 1220, whereby load estimator 230 uses a pressure/weight algorithm 1206 to generate estimated load 1242 from pressure value 1220.

Block 1512 is a decision. If, in block 1512, method 1500 determines that the derivative has peaked, method 1500 continues with block 1514; otherwise method 1500 continues with block 1516. In one example of block 1512, lift detector 260 evaluates a peak flag 1225, initially cleared and set by block 1518, to determine whether a peak in $1^{st}$ derivative values 1222 has been detected. Block 1514 is a decision. If, in block 1514, method 1500 determines that the derivative value is less than a minimum derivative value (e.g., 400) for ten consecutive iterations, then method 1500 continues with block 1524; otherwise, method 1500 continues with block 1520. For example, after $1^{st}$ derivative values 1222 have peaked (e.g., peak flag is set) and reduce below a value of 400, indicated by line 1310, for ten consecutive cycles, then FW 222 is at a height that provides clearance 1102 between landing gear 306 and the ground. That is, the distance that FW 222 is raised during ten cycles of the loop in method 1500 corresponds to clearance 1102.

Block 1516 is a decision. If, in block 1516, method 1500 determines that height of the FW is greater than a minimum lift-off height (e.g., 1.19 m) and the $1^{st}$ derivative is greater than a minimum derivative peak threshold 1224 (e.g., 1000), then method 1500 continues with block 1518; otherwise method 1500 continues with block 1520. For example, as shown in FIGS. 13 and 14, when FW 222 initially moves at point 1408, $1^{st}$ derivative value 1222 exceeds the minimum derivative peak threshold 1224 indicated by line 1306 to form peak 1308. However, since the height of FW 222 is below the minimum lift-off height indicated by line 1406, this initial peak is ignored, and method 1500 proceeds with block 1520 without setting the peak flag. A subsequent peak 1304 in $1^{st}$ derivative value 1222 occurs when $1^{st}$ derivative value 1222 exceeds the minimum derivative peak threshold 1224 indicated by line 1306 and when the sensed height of FW 222 at corresponding point 1404 is above the minimum lift-off height indicated by line 1406, method 1500 proceeds with block 1518. In block 1518, method 1500 sets the peak flag. In one example of block 1518, lift detector 260 sets peak flag 1225, which is evaluated in block 1512.

Block 1520 is a decision. If, in block 1520, method 1500 determines that the height of the FW is greater than a maximum FW height threshold (e.g., 1.32 m) and the estimated load is greater than a minimum load threshold (e.g., 15 kN), then method 1500 continues with block 1524; otherwise method 1500 continues with block 1522. Block 1520 takes into account a scenario where trailer 106 is low (e.g., landing gear 306 is not sufficiently extended) such that FW 222 is already holding landing gear 306 off the ground when underneath, and therefore there is no significant change in $1^{st}$ derivative values 1222 as FW 222 is raised (e.g., since trailer 106 is already lifted). Block 1520 thereby detects when the height of FW 222 is above a maximum height threshold, indicated by line 1410 and when the estimated load (computed in block 1510) is above the minimum load threshold. Block 1522 is a decision. If, in block 1522, method 1500 determines that the estimated load is greater than a maximum load threshold (e.g., 60 kN), then method 1500 continues with block 1524; otherwise method 1500 continues with block 1502, and blocks 1502 through 1522 repeat. Block 1522 thereby addresses the scenario where FW 222 is carrying a load greater than 60 kN (e.g., a very heavy trailer) and the use of a maximum load threshold ensures that FW 222 is lifting, for a very heavy trailer, at least a minimum amount needed to relieve significant forces off landing gear 306. For example, when the maximum load threshold is reached, FW 222 is handling most of the weight of trailer 106, such that even if landing gear 306 appears to be still on the ground, landing gear 306 is not supporting any significant weight of trailer 106.

In block 1524, method 1500 determines that the trailer is lifted and stops raising FW 222. In one example of block 1524, lift detector 260 commands FW actuator 224 to stop raising FW 222. Method 1500 then terminates.

Blocks 1502 through 1522 of method 1500 form a loop that repeats to raise FW 222 and lift the front end of trailer 106, detecting when landing gear 306 leaves the ground, and then continuing to raise FW 222 for ten iterations of the loop such that landing gear 306 is raised a consistent height (e.g., clearance 1102) off the ground, irrespective of the extension of landing gear 306 and the starting height of the front end of trailer 106.

Although position sensor 248 does not directly provide the height of FW 222 above the ground, a calibration routine may be used such that lift detector 260 may convert values from position sensor 248 into height. For example, FW actuator 224 is controlled to position FW 222 such that position sensor 248 reads zero (e.g., zero height) and the height of FW 222 above ground is measured. FW actuator 224 is then controlled to position FW 222 at its maximum height, the position sensor 248 is read, and the height of FW 222 above the ground is measured. Thus, values of position sensor 248 are known for the minimum and maximum positions of FW 222. The equation $y=mx+c$, is solved where y is the height of FW 222 above the ground, x is position sensor 248 value, and c is the zero height of FW 222. Then, the equation $y=mx+c$ with the found value of m is used to determine the height of FW 222 for any read value from position sensor 248.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

Combination of Features

Features described above as well as those claimed below may be combined in various ways without departing from the scope hereof. The following enumerated examples illustrate some possible, non-limiting combinations:

(A1) A method detects and prevents stall of a drive motor of an autonomous electric tractor. The method includes: receiving, at intervals, a motor current value from a drive circuit of the autonomous electric tractor; determining when the motor current value reaches or exceeds a first current threshold; and when the motor current value reaches or exceeds the first current threshold: applying brakes; and inhibiting a throttle controlling the drive motor.

(A2) Embodiments of (A1) further including setting a motor stall flag; determining a stall location based on a current location of the autonomous electric tractor; and starting a timer.

(A3) Embodiments of either (A1) or (A2) further including determining when, after exceeding the first current threshold, the motor current value is below a second current threshold or when the timer reaches a first time-limit; and when the motor current value is below the second current threshold or when the timer reaches the first time-limit: clearing the motor stall flag and un-inhibiting the throttle.

(A4) Any of the embodiments (A1)-(A3) further including waiting until the motor stall flag is cleared and implementing a stall recovery routine for the autonomous electric tractor.

(A5) In embodiments of (A4), the step of implementing the stall recovery routine when attempting to couple with a trailer further including: controlling the autonomous electric tractor to move forward a predetermined distance, and controlling the autonomous electric tractor to attempt coupling with the trailer using a greater throttle setting than previously used.

(A6) In embodiments of (A4), the step of implementing the stall recovery routine when attempting to reverse a trailer against at least one dock pad of a loading dock further including: controlling the autonomous electric tractor to move forward a predetermine distance; controlling the autonomous electric tractor to reverse the trailer against the at least one dock pad; and determining the trailer is docked when the motor stall flag is set.

(A7) In embodiments of (A4), the step of implementing the stall recovery routine of an apron maneuver when the autonomous electric tractor is traversing an apron of an autonomous yard further including: triggering remote assist functionality; receiving an instruction to retry the apron maneuver; controlling the autonomous electric tractor to reverse direction for a predetermined distance; and controlling the autonomous electric tractor to repeat the apron maneuver with a higher throttle setting.

(A8) Embodiments of (A7) further including detecting when the current location of the autonomous electric tractor passes the stall location; and setting the throttle of the autonomous electric tractor to a nominal throttle setting.

(B1) A method for preventing stall of a motor of an autonomous vehicle, includes: receiving, at intervals, a motor current value from a drive circuit of the autonomous electric tractor; and when the motor current value reaches or exceeds a first current threshold: applying brakes; inhibiting a throttle controlling the drive motor for a predefined period from the determining the motor current value reached or exceeded the first current; and then un-inhibiting the throttle.

(B2) Embodiments of (B1) further include determining a stall location based on a current location of the autonomous electric tractor; and implementing, after the waiting, a stall recovery routine for the autonomous electric tractor.

(B3) In embodiments of (B2), the stall recovery routine includes: determining the stall location indicates the autonomous electric tractor is attempting to hitch to a trailer; controlling the autonomous electric tractor to move forward a predetermined distance; and controlling the autonomous electric tractor to attempt coupling with the trailer using a greater throttle setting than previously used.

(B4) In embodiments of (B2), the stall recovery routine includes: determining the stall location indicates the autonomous electric tractor is attempting to reverse a trailer against at least one dock pad of a loading dock; controlling the autonomous electric tractor to move forward a predetermine distance; controlling the autonomous electric tractor to reverse the trailer against the at least one dock pad; and determining the trailer is docked when the motor current value reaches or exceeds the first current threshold.

(B5) In embodiments of (B2), the stall recovery routine includes: determining the stall location indicates the autonomous electric tractor is traversing an apron of an autonomous yard; controlling the autonomous electric tractor to reverse direction for a predetermined distance; and controlling the autonomous electric tractor to repeat the apron maneuver with a higher throttle setting.

(B6) In embodiments of (B2), the stall recovery routine includes: detecting when the current location of the autonomous electric tractor passes the stall location; and setting the throttle of the autonomous electric tractor to a nominal throttle setting.

(C1) A method for determining height above the ground of a landing gear of a trailer coupled with a tractor, includes: controlling a hydraulic pump to pump a hydraulic fluid into a chamber of a piston coupled to a fifth wheel of the tractor to raise the fifth wheel; sensing, at intervals as the fifth wheel rises, a pressure value of the hydraulic fluid in the chamber; and processing the pressure values to determine when the landing gear is lifted off the ground.

(C2) In embodiments of (C1), the processing including processing the pressure values to determine a peak in first derivative values indicative of the landing gear lifting off the ground.

(C3) Either of the embodiments (C1) and (C2) further including stopping the hydraulic pump a predetermined period after the landing gear is lifted off the ground, wherein the predetermined period and a rate of raising the fifth wheel corresponds to a clearance height of the landing gear above the ground.

What is claimed is:

1. A method for determining height above the ground of a landing gear of a trailer coupled with a tractor, comprising:
- controlling a hydraulic pump to pump a hydraulic fluid into a chamber of a piston coupled to a fifth wheel of the tractor to raise the fifth wheel;
- sensing, at intervals as the fifth wheel rises, a pressure value of the hydraulic fluid in the chamber;
- processing the pressure values to determine when the landing gear is lifted off the ground; and
- stopping the hydraulic pump a predetermined period after the landing gear is lifted off the ground, wherein the predetermined period and a rate of raising the fifth wheel corresponds to a clearance height of the landing gear above the ground.

2. The method of claim 1, the processing comprising processing the pressure values to determine a peak in first derivative values indicative of the landing gear lifting off the ground.

3. The method of claim 1, further comprising after the hydraulic pump is stopped:
- sensing the pressure value of the hydraulic fluid in the chamber;
- sensing a second pressure value of the hydraulic fluid in a second chamber of the piston;
- determining a differential between the pressure value and the second pressure value; and
- determining an estimate of a weight of a front end of the trailer based on the differential.

4. A method for determining height above the ground of a landing gear of a trailer coupled with a tractor, comprising:
- controlling a hydraulic pump to pump a hydraulic fluid into a chamber of a piston coupled to a fifth wheel of the tractor to raise the fifth wheel;
- sensing, at intervals as the fifth wheel rises, a pressure value of the hydraulic fluid in the chamber; and
- processing the pressure values to determine when the landing gear is lifted off the ground; and
- determining a height of the fifth wheel based on a position sensed by a position sensor on an actuator of the fifth wheel, wherein a peak is determined after the height is above a minimum lift-off height.

5. A method for determining height above the ground of a landing gear of a trailer coupled with a tractor, comprising:
- controlling a hydraulic pump to pump a hydraulic fluid into a chamber of a piston coupled to a fifth wheel of the tractor to raise the fifth wheel;
- sensing, at intervals as the fifth wheel rises, a first pressure value of the hydraulic fluid in the chamber; and
- processing the pressure values to determine when the landing gear is lifted off the ground;
- determining a height of the fifth wheel based on a position sensed by a position sensor on an actuator of the fifth wheel;
- sensing a second pressure value of the hydraulic fluid in a second chamber of the piston;
- determining a differential between the first pressure value and the second pressure value;
- determining an estimate of a weight of a front end of the trailer based on the differential; and
- stopping the hydraulic pump when the height is above a maximum height threshold and the weight is above a minimum load threshold.

* * * * *